(No Model.)
S. E. BARNES.
TIRE FOR VEHICLE WHEELS.
No. 579,216. Patented Mar. 23, 1897.
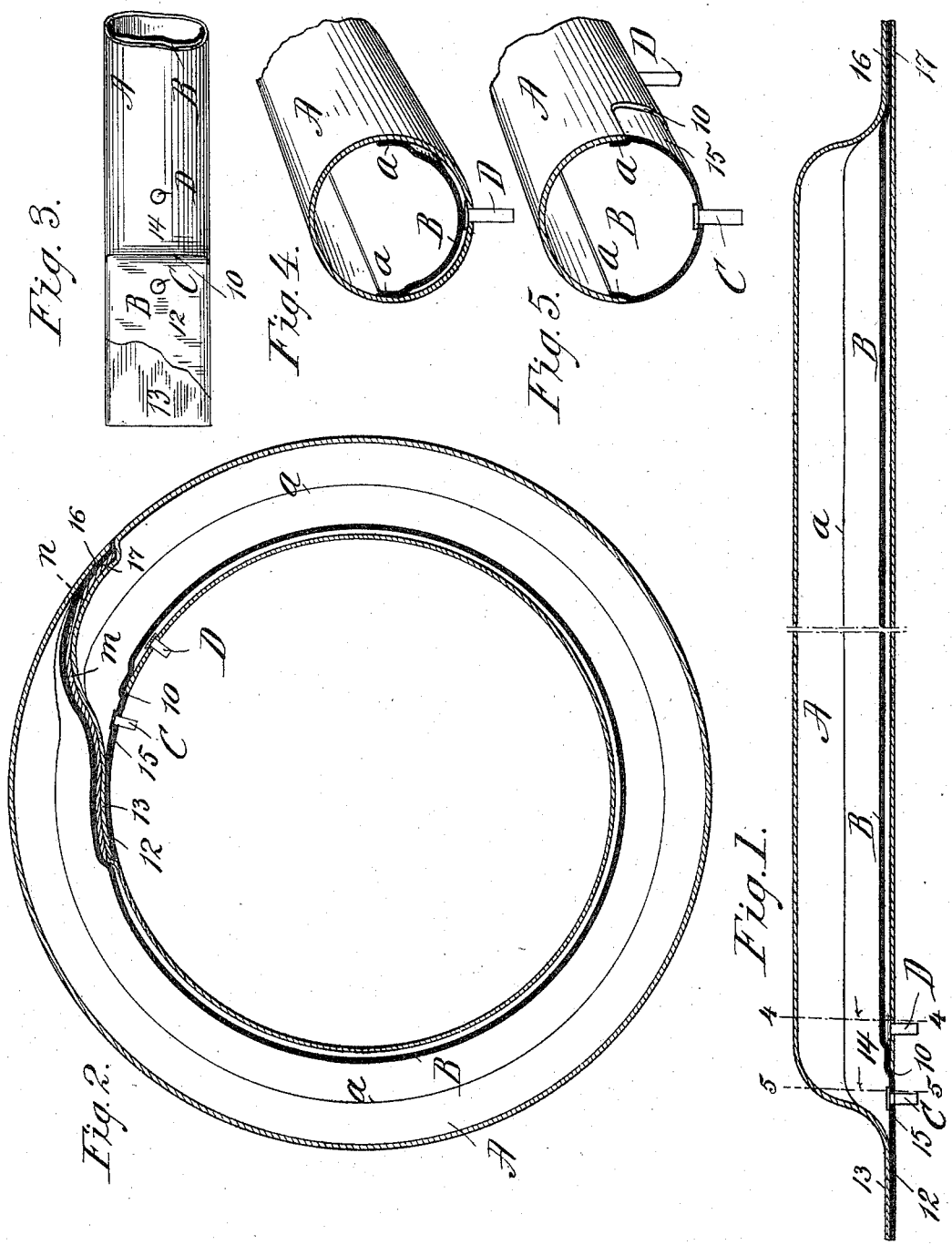
Witnesses:
N. M. Bellows.
M. J. Bellows.
Inventor,
Samuel E. Barnes,
by Wm. S. Bellows,
Attorney.
THE NORRIS PETERS CO., PHOTO-LITHO., WASHINGTON, D. C.

UNITED STATES PATENT OFFICE.

SAMUEL E. BARNES, OF WILLIMANSETT, MASSACHUSETTS.

TIRE FOR VEHICLE-WHEELS.

SPECIFICATION forming part of Letters Patent No. 579,216, dated March 23, 1897.

Application filed June 5, 1896. Serial No. 594,382. (No model.)

*To all whom it may concern:*

Be it known that I, SAMUEL E. BARNES, a citizen of the United States, and a resident of Willimansett, in the county of Hampden and State of Massachusetts, have invented certain new and useful Improvements in Tires for Vehicle-Wheels, of which the following is a specification.

This invention relates to improvements in pneumatic tires, and more particularly to the air-tube which is provided for or incorporated in and as a part of the tire.

The object of the invention is to so construct the inflatable air-tube, in a novel, simple, and inexpensive manner, as to render it available for indefinitely-continued use even after the same has been punctured; and the improved air-tube for a tire involves the employment of parts and arrangements all substantially as will hereinafter fully appear, and be set forth in the claim.

Reference is to be had to the accompanying drawings, forming part of this specification, in which the invention is illustrated, and in which—

Figure 1 is a central longitudinal sectional view of the air-tube of a tire for a vehicle-wheel. Fig. 2 is a central sectional view of the air-tube as in its application on the rim of a wheel. Fig. 3 is a plan view of the under side of such portion of the air-tube as corresponds to the left-hand end portion of Fig. 1, a layer of the material thereat being partly broken away. Figs. 4 and 5 are cross-sectional and perspective views as taken on the lines 4 4 and 5 5, Fig. 1.

I will now proceed to describe the present air-tube for a tire as I have constructed it and put it into successful operation, and, referring to the drawings, A represents the inner air-tube of rubber, such as is extensively used in the well-known Morgan & Wright and other tires, the end portions being closed. Ordinarily in such air-tubes both ends are closed by having the end portions of the tube collapsed, with the upper and lower walls superimposed and cemented together for an inch or two. In the present instance the base portion of the tube, as seen at 10, is omitted for a short space near one end. A long diaphragm or strip B, of impervious flexible material—thin elastic rubber—has its edge portions *a a* cemented or united to opposite sides of the inner wall of the air-tube, it intermediately sagging, so as to normally lie closely along the base of the tube. The one end portion 12 of the diaphragm (seen at the left in Fig. 1) is cemented to the end portion 13 of the upper collapsed half or portion of the air-tube proper, and at 14 it is again cemented to the portion of the base of the air-tube adjacent the recess 10 therein, and the portion 15 of this diaphragm between the said areas 12 14 of attachment to the base constitutes the closure at this place for the air-chamber within the tube proper.

The diaphragm B, edgewise joined to the opposite internal walls of the air-tube, extends entirely to the other end of such tube, and it and the layers 16 and 17, corresponding to the collapsed upper and lower halves of the air-tube, are effectually cemented together, the diaphragm being free from the base of the air-tube between its place of base attachment 14 and the farther closed end of the tube.

C represents a valved passage applied at and entering through the aforesaid base closure portion 15 of the diaphragm to the air-chamber proper above the diaphragm, through which to inflate the air-tube in the ordinary way.

D represents a similar valved passage entering through the base of the air-tube beyond or at a point removed from the area of attachment 14 of the diaphragm, through means of which air may be introduced under pressure into the subchamber between and inclosed by the lower half of the tube proper and the diaphragm.

The air-tube as shown in Fig. 2 is represented in its annular form, as when applied upon the rim of a wheel, the closed end portions overlapping, whereby, when inflated, the continuous annular pneumatic cushion is acquired. Now in practice, this air-tube being applied in a tire and the air-tube proper being inflated through valve C, if the tube becomes punctured at its tread side or half, whereby the air therein is permitted to exude, the rider may again inflate the tire by the application of the pump to the valve D, the pressure under the diaphragm forcing the latter to assume a position against the inner wall at the tread side of the tire, whereupon the tire is rehabilitated for indefinite service, and without the necessity of plugging or otherwise repairing the punctured place. The places of union *a a* of the diaphragm to the opposite side walls of the air-tube may be somewhat nearer the base of tube than here represented, the exact location of such line of union being immaterial.

A tire-tube embodying the present invention may be structurally and permanently made into annular form, as represented in Fig. 2, with the diagonally-arranged traversing partition, (seen at *m*,) the rubber constituting this latter being homogeneous or permanently united, it being understood that the diaphragm B lies unattached upon such partition, it being attached to such partition *m* only for a short area under the tread of the tire—for instance, for that portion to the right of the line *n*; but whether the tire-tube is constructed in the form shown in Fig. 1 or annular and endless it possesses, when applied on the rim, the characteristics of a part of the base of the tube constituted by an attached portion of the diaphragm, through which a valved passage enters to the tube-chamber proper, a subchamber under the diaphragm, to which the second valved passage communicates, and the diagonally-arranged portion " overhanging " the base closure portion 15 of the diaphragm, above which portion an unattached part of the diaphragm is disposed, so that when the diaphragm-chamber is utilized in case of exigency by inflation the tube-chamber may be filled and expanded at that portion over the said portion 15 uniformly with the rest of the chamber, and it is to be observed that in the present tire-tube the capabilities attained by the invention are acquired by constructions and arrangements of the utmost simplicity and cheapness, the slight additional expense involved being out of proportion to the value and practicability of the invention.

I claim—

An air-tube for a pneumatic tire consisting of a tube, proper, A, having its base portion at one end omitted, as at 10, a diaphragm-strip B edgewise attached to opposite inner sides of the tube proper, having attachments with the end portion 13 of the tube, serving to close the base of the tube at the place where the tube-base is omitted and having an attachment at 14 to the inner portion of the tube-base near the margin of the recess 10, the diaphragm having its other end inclosed and secured between the upper and lower thicknesses of the tube at the other end of the latter, and being otherwise unsecured, the valved passage C entering through the closing part constituted by said base portion of the diaphragm, and the valved passage D entering through the base of the tube proper to the chamber below the diaphragm, substantially as described.

In testimony that I claim the foregoing as my invention I have signed my name, in presence of two witnesses, this 4th day of June, 1896.

SAMUEL E. BARNES.

Witnesses:
WM. S. BELLOWS,
N. M. BELLOWS.